(12) United States Patent
Gumpoltsberger et al.

(10) Patent No.: US 8,342,050 B2
(45) Date of Patent: Jan. 1, 2013

(54) DUAL CLUTCH TRANSMISSION

(75) Inventors: Gerhard Gumpoltsberger, Friedrichshafen (DE); Juergen Wafzig, Eriskirch (DE); Matthias Reisch, Ravensburg (DE); Wolfgang Rieger, Friedrichshafen (DE); Ralf Dreibholz, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 401 days.

(21) Appl. No.: 12/681,936

(22) PCT Filed: Oct. 8, 2008

(86) PCT No.: PCT/EP2008/063423
§ 371 (c)(1),
(2), (4) Date: Apr. 7, 2010

(87) PCT Pub. No.: WO2009/050071
PCT Pub. Date: Apr. 23, 2009

(65) Prior Publication Data
US 2010/0206108 A1 Aug. 19, 2010

(30) Foreign Application Priority Data
Oct. 15, 2007 (DE) .......................... 10 2007 049 268

(51) Int. Cl.
*F16H 3/08* (2006.01)
(52) U.S. Cl. ......................................................... 74/330
(58) Field of Classification Search .................... 74/330, 74/333, 340
See application file for complete search history.

(56) References Cited

U.S. PATENT DOCUMENTS

| 6,244,123 | B1 | 6/2001 | Hegerath et al. |
| 6,869,379 | B2 * | 3/2005 | Voss et al. ..................... 475/218 |
| 7,066,043 | B2 * | 6/2006 | Kim et al. ........................ 74/330 |
| 7,225,696 | B2 * | 6/2007 | Gitt ................................. 74/340 |
| 7,246,536 | B2 | 7/2007 | Baldwin |
| 7,287,442 | B2 | 10/2007 | Gumpoltsberger |

(Continued)

FOREIGN PATENT DOCUMENTS

DE 38 22 330 A1 7/1989
(Continued)

OTHER PUBLICATIONS

Prof. Dr. R Tenberge; "Doppelkupplungsgetriebe in Planetenradbauweise Getriebestrukturen zwischen Automatik-und Doppelkupplungsgetrieben" Wissenportal baumaschine de 3 2007.

*Primary Examiner* — Ha D. Ho
(74) *Attorney, Agent, or Firm* — Davis & Bujold, PLLC

(57) ABSTRACT

A double clutch transmission with two clutches connected to a drive shaft and to one of two transmission input shafts. Fixed gears are coupled to the input shafts and engage idler gears. Several coupling devices connect the idler gears to a countershaft which have an output gear that couple with gears of an output shaft such that forward and reverse gears can be shifted. Two dual gear planes each comprise two idler gears, each supported by a respective countershaft, and one fixed gear. In each dual gear plane, at least one idler gear is used for two gears. Two single gear planes each comprise an idler gear and a fixed gear such that at least one winding-path gear is shifted via a shifting device on the second countershaft, and at least one winding-path gear is shifted via a non-engaged coupling device, assigned to an output gear wheel on the first countershaft.

14 Claims, 10 Drawing Sheets

U.S. PATENT DOCUMENTS

| | | | |
|---|---|---|---|
| 7,597,644 B2 * | 10/2009 | Rodgers, II | 475/218 |
| 7,604,561 B2 * | 10/2009 | Earhart | 475/218 |
| 7,604,565 B2 * | 10/2009 | Lee et al. | 477/3 |
| 8,051,732 B2 * | 11/2011 | Gitt | 74/331 |
| 2006/0054441 A1 | 3/2006 | Ruedle | |
| 2009/0036247 A1 * | 2/2009 | Earhart et al. | 475/35 |

FOREIGN PATENT DOCUMENTS

| | | |
|---|---|---|
| DE | 102 39 540 A1 | 3/2004 |
| DE | 103 05 241 A1 | 9/2004 |
| DE | 10 2004 001 961 A1 | 8/2005 |
| DE | 10 2004 012 909 A1 | 10/2005 |
| DE | 10 2005 028 532 A1 | 12/2006 |
| DE | 10 2005 045 005 A1 | 3/2007 |
| FR | 2 880 088 A1 | 6/2006 |
| GB | 2 424 250 A | 9/2006 |
| WO | 2005/068875 A3 | 7/2005 |
| WO | 2005/093289 A1 | 10/2005 |

* cited by examiner

| G | ZS | K1 | K2 | A | B | C | D | E | F | I | K | S_ab1 | S_ab2 |
|---|---|---|---|---|---|---|---|---|---|---|---|---|---|
| G1 | $i\_3 \cdot i\_4 \cdot i\_2$ |  | 1 | 1 |  |  |  | 1 |  |  |  |  | 1 |
| G2 | $i\_2$ | 1 |  | 1 |  |  |  | 1 |  |  |  | 1 | 1 |
| G3 | $i\_3$ |  | 1 |  |  | 1 |  |  |  |  |  | 1 | 1 |
| G4 | $i\_4$ | 1 |  |  |  | 1 |  |  |  |  |  | 1 | 1 |
| G5 | $i\_5$ |  | 1 |  |  |  | 1 |  |  |  |  | 1 | 1 |
| G6 | $i\_6$ | 1 |  |  |  |  |  |  | 1 |  |  | 1 | 1 |
| G7 | $i\_5 \cdot i\_2 \cdot i\_4$ |  | 1 |  |  | 1 |  |  |  |  | 1 |  |  |
| R– GEAR | | | | | | | | | | | | | |
| R1 | $i\_R$ | 1 |  |  | 1 |  |  |  |  |  |  | 1 | 1 |
| R2 | $i\_5 \cdot i\_6 \cdot i\_R$ |  |  |  | 1 |  |  |  | 1 |  |  | 1 |  |
| LOW SPEED GEAR | | | | | | | | | | | | | |
| C1 | $i\_2 \cdot i\_5 \cdot i\_3$ | 1 |  |  |  |  |  |  |  |  | 1 | 1 | 1 |

Fig. 2

| G | ZS | K1 | K2 | A | B | C | D | E | F | I | K | S_ab1 | S_ab2 |
|---|---|---|---|---|---|---|---|---|---|---|---|---|---|
| G1 | i_3·i_4·i_2 |  | 1 | 1 |  | 1 |  | 1 |  |  |  |  | 1 |
| G2 | i_2 | 1 |  |  |  |  |  | 1 |  |  |  |  | 1 |
| G3 | i_3 |  | 1 | 1 |  |  |  |  |  |  |  | 1 | 1 |
| G4 | i_4 | 1 |  |  |  | 1 |  |  |  |  |  | 1 | 1 |
| G5 | i_5 |  | 1 |  |  |  | 1 |  |  |  |  | 1 | 1 |
| G6 | i_6 | 1 |  |  |  |  |  |  | 1 |  |  | 1 | 1 |
| G7 | i_5·i_2·i_4 |  | 1 | 1 |  | 1 |  |  |  |  | 1 | 1 | 1 |

| R– GEAR | | | | | | | | | | | | | |
|---|---|---|---|---|---|---|---|---|---|---|---|---|---|
| R1 | i_R |  |  |  | 1 |  |  |  |  |  |  | 1 | 1 |
| R2 | i_5·i_6·i_R |  | 1 |  | 1 |  |  |  | 1 |  |  | 1 | 1 |

| LOW SPEED GEAR | | | | | | | | | | | | | |
|---|---|---|---|---|---|---|---|---|---|---|---|---|---|
| C1 | i_2·i_5·i_3 | 1 |  | 1 |  |  | 1 |  |  |  | 1 |  | 1 |

| G | ZS | K1 | K2 | A | B | C | D | E | F | I | K | S_abl |
|---|---|---|---|---|---|---|---|---|---|---|---|---|
| G1 | i_5·i_6·i_2 | | 1 | 1 | | 1 | | 1 | | | | |
| G2 | i_2 | 1 | | | | | | 1 | | | | 1 |
| G3 | i_3 | | 1 | | | | 1 | | | | | 1 |
| G4 | i_4 | 1 | | 1 | | | | | | | | 1 |
| G5 | i_5 | | 1 | | | 1 | | | | | | 1 |
| G6 | i_6 | 1 | | | | 1 | | | | | | 1 |
| G7 | i_3·i_2·i_6 | | 1 | | | 1 | | | | | 1 | 1 |

| R- GEAR | | | | | | | | | | | | |
|---|---|---|---|---|---|---|---|---|---|---|---|---|
| R1 | i_R | 1 | | 1 | | 1 | | | | | | |
| R2 | i_5·i_6·i_R | | 1 | | | | | | 1 | 1 | | 1 |

Fig. 8

| G | ZS | K1 | K2 | A | B | C | D | E | F | H | K | S_ab1 | S_ab2 |
|---|---|---|---|---|---|---|---|---|---|---|---|---|---|
| G1 | i_5·i_6·i_2 | | 1 | 1 | 1 | 1 | | 1 | | | | | 1 |
| G2 | i_2 | 1 | | | | | | 1 | | | | 1 | 1 |
| G3 | i_3 | | 1 | | | | 1 | | | | | 1 | 1 |
| G4 | i_4 | 1 | | | | | | | 1 | | | 1 | 1 |
| G5 | i_5 | | 1 | 1 | | | | | | | | 1 | 1 |
| G6 | i_6 | 1 | | | | 1 | | | | | | 1 | 1 |
| G7 | i_3·i_2·i_6 | | 1 | | | 1 | | | | | 1 | 1 | 1 |
| R– GEAR | | | | | | | | | | | | | |
| R1 | i_R | 1 | | | 1 | | | | 1 | | | 1 | 1 |
| R2 | i_3·i_4·i_R | | 1 | | 1 | | 1 | | | | | 1 | 1 |
| R3 | i_R·i_5·i_3 | 1 | | | | | 1 | | | 1 | | | 1 |

Fig. 10

| G | ZS | K1 | K2 | A | B | C | D | E | F | I | K | S_ab1 | S_ab2 |
|---|---|---|---|---|---|---|---|---|---|---|---|---|---|
| G1 | i_3·i_4·i_2 |  | 1 |  |  |  |  |  | 1 |  | 1 | 1 | 1 |
| G2 | i_2 | 1 |  |  |  |  |  |  | 1 |  |  | 1 | 1 |
| G3 | i_3 | 1 | 1 |  |  |  | 1 |  |  |  |  | 1 | 1 |
| G4 | i_4 |  |  |  |  |  |  | 1 |  |  |  | 1 | 1 |
| G5 | i_5 |  | 1 |  |  |  |  |  |  |  |  | 1 | 1 |
| G6 | i_6 | 1 |  |  | 1 |  |  |  |  |  |  | 1 | 1 |
| G7 | i_4·i_3·i_5 | 1 |  | 1 |  |  |  |  |  |  | 1 |  |  |
| R- GEAR | | | | | | | | | | | | | | |
| R1 | i_R·i_5·i_3 | 1 |  | 1 |  | 1 | 1 |  |  |  |  |  | 1 |
| OVERDRIVE GEAR | | | | | | | | | | | | | | |
| O1 | i_3·i_2·i_6 |  | 1 |  | 1 | 1 | 1 |  | 1 |  |  | 1 |  |

DUAL CLUTCH TRANSMISSION

This application is a National Stage completion of PCT/EP2008/063423 filed Oct. 8, 2008, which claims priority from German patent application serial no. 10 2007 049 268.7 filed Oct. 15, 2007.

FIELD OF THE INVENTION

The present invention relates to a dual clutch transmission for a motor vehicle.

BACKGROUND OF THE INVENTION

Known from the publication DE 103 05 241 A1 is a 6-speed or 7-speed dual clutch transmission. The dual clutch transmission comprises two clutches, each connected with their inputs to the drive shaft and the output to one of the two transmission input shafts. The two transmission input shafts are coaxially positioned towards each other. In addition, two countershafts are axially parallel to the transmission input shafts, their idler gear wheels mesh with the fixed gear wheels of the transmission input shafts. Furthermore, coupling devices that are axial movable are connected in a rotationally fixed manner to the countershaft to shift the respective gear wheels. Each selected ratio is transferred by the drive gear wheels to a differential transmission. To achieve the desired gear ratio steps in this known dual clutch transmission, a large number of wheel planes are required, so that a significant amount of installation space is required.

In addition, a spur gear variable-speed transmission is known from the publication DE 38 22 330 A1. The spur gear variable-speed transmission comprises a dual clutch that can be shifted under load one part of which is connected to a drive shaft and the other part is connected to a hollow drive shaft, rotatably supported on the drive shaft. For certain gear ratios, the drive shaft can be coupled with the hollow drive shaft through a shifting device.

Known from the publication DE 10 2004 001 961 A1 is a shift-under-load transmission with two clutches, each of which are assigned to a partial transmission. The transmission input shafts of the two partial transmissions are positioned coaxially with respect to each other and mesh, via fixed gear wheels, with idler gear wheels of the designated countershaft. The respective idler gear wheels of the countershafts can be connected in a rotationally fixed manner to the respective countershaft by means of designated shifting devices. The particular idler gear wheels of the countershaft can be connected in a rotationally fixed manner by means of the assigned shifting devices with the associated countershaft. A 7-gear transmission, among other things, is known from this publication in which an additional shift element is provided to connect the two transmissions input shafts to establish an additional transmission stage. The 7-gear transmission requires in this embodiment at least six wheel planes in the two partial transmissions, to achieve the transmission stages. This increases the construction length of the transmission in the axial direction, thereby significantly limiting its use in a motor vehicle.

SUMMARY OF THE INVENTION

It is the task of the present invention to propose a dual clutch transmission based on the type previously described, in which shift-under-load transmission ratio steps can be realized, in a cost-efficient manner and with just a few components, which need little installation space.

Thus, a dual clutch transmission with two clutches, optimized for needed installation space, is proposed, in which the inputs are connected with a drive shaft and the outputs of each being connected with one of two transmission input shafts, which are coaxial to each other. The dual clutch transmission comprises at least two countershafts, on which gear wheels, designed as idler gear wheels, are rotatably mounted, and gear wheels are positioned on the two transmissions input shafts in a rotationally fixed manner and designed as fixed gear wheels, which at least partially mesh with the idler gear wheels. In addition, several coupling devices, or similar, are provided to connect an idler gear wheel to a countershaft in a rotationally fixed manner. The dual clutch transmission, in accordance with the invention, has one output gear wheel, or constant pinion, respectively, mounted on each of the two countershafts, which are coupled with gears of a drive shaft, to connect the respective countershaft with the output, and to have at least an activated or engaging shifting device, or similar, as a so called winding-path gear shifting device for connecting two gear wheels in a rotationally fixed manner, such that several power shiftable forward gears and at least one reverse gear can be shifted.

The inventive dual clutch transmission can preferably comprise just four gear planes, whereby at least one of the two output gear wheels is shiftably connected with the respective countershaft. For instance, two dual gear planes are provided in the dual clutch transmission and in each dual gear plane, one idler gear wheel on each of the first and the second countershafts is assigned to a fixed gear wheel of one of the transmission input shafts, whereby in each dual gear plane at least one idler gear wheel can be used for at least two gears, and two single gear planes are provided, where one idler gear wheel on the countershafts is assigned to a fixed gear wheel on one of the transmission input shafts, so that at least one winding-path gear can be shifted via at least one shifting device on the second countershaft and at least one winding path-gear can be shifted, with at least one disengaged coupling device on the first countershaft, assigned to the output gear wheel. In the disengaged condition of the coupling device, the respective output gear wheel can be decoupled from the assigned countershaft, whereby, in the non-shifted or non-activated state, the coupling device which is assigned to the output gear wheel is engaged, so that the respective output gear wheel is connected in a rotationally fixed manner to the assigned countershaft. Due to the possible multi-uses of the idler gear wheels, the proposed dual clutch transmission enables a maximum number of gear ratios, whereby, with as few gear planes as possible, preferably all forward gears and all reverse gears can be shifted under load in sequence.

By using two single gear planes, instead of a dual gear plane, meaning one fixed gear wheel is replaced by two fixed gear wheels, harmonized, progressive gear shifts can be achieved in this inventive dual clutch transmission, especially for the fourth, fifth, sixth, and seventh gear. In addition, a maximum of four shifting devices are used on each countershaft and which are designed as shifting devices and/or coupling devices, to only use a maximum of two activating devices on each countershaft. Furthermore, the last or second last gear step in this inventive dual clutch transmission can be designed higher than the respective current gear, to provide the driver, when shifting with a lot of torque and drive power. Also, the highest power shiftable gear can be designed as a winding-path gear.

The inventive and proposed dual clutch transmission can preferably be designed as a 7-gear transmission. Due to the reduced installation space requirement, as compared to known transmission configurations, the inventive dual clutch transmission is especially applicable in a front-transverse construction configuration. However, other construction methods are also possible, and are depending on the design and the available construction of the respective motor vehicle.

It can be provided, within the scope of a possible embodiment of this invention, that, by means of a shifting device on the second countershaft, an idler gear wheel of the second partial transmission can be connected with the idler gear wheel of the first partial transmission, so that, via the activated shifting device at least a seventh forward gear can be shifted as a winding-path gear, and when the coupling device on the first countershaft is disengaged, the output gear wheel is decoupled from the first countershaft, so that at least a first forward gear can be shifted. It is possible, that in the previously named embodiment and with a disengaged coupling device, a low speed gear can be shifted as a winding-path gear.

In accordance with another embodiment of the invention, it can be provided that, by means of the activated shifting device on the second countershaft, at least a first forward gear and a seventh forward gear can be shifted as a winding-path gear, and when the coupling device on the first countershaft is disengaged, at least a reverse gear (R1) can be shifted as a winding-path gear. Also other applications and gearing configurations are possible.

Through the inventive dual clutch transmission, winding-path gears can be realized, via at least one disengaged coupling device and via at least one engaged shifting device, in which gear wheels of both partial transmissions are coupled with each other, to achieve a flow of force through both partial transmissions. The applied coupling device, in each case, separates the respective output gear wheel from the assigned countershaft, when the used coupling device is not engaged. Due to having at least one shiftable output gear wheel on a countershaft, not only more winding-path gears can be realized as compared to using just one shifting device, but also the gear shifting can be matched better. The used shifting device serves for coupling the two idler gear wheels and bringing the transmission input shafts into dependency of each other.

Independent of the respective embodiment of the dual clutch transmission, positioning of the shifting device for the coupling of two defined idler gear wheels can be varied, such that the shifting device does not have to be necessarily positioned between the idler gear wheels that need to be coupled. Other positioning locations of the shifting devices are possible, to optimize, for instance, coupling to an actuating device.

It can be provided with the dual clutch transmission, in accordance with a possible embodiment, that the first gear plane, designed as dual gear plane, comprises a fixed gear wheel on the second transmission input shaft of the second partial transmission, the second gear plane, designed as dual gear plane, and the third and fourth gear plane, designed as single gear planes, comprise three fixed gear wheels on the first transmission input shaft of the first partial transmission. However, it is also possible, in a different embodiment, that the first gear plane, designed as dual gear plane, comprises a fixed gear wheel on the second transmission input shaft of the second partial transmission, and that the second, gear plane, designed as single gear plane, and the fourth gear plane, designed as dual gear plane, comprises three fixed gear wheels on the first transmission input shaft of the first partial transmission. Hereby, independent of the respective embodiment variation, each of the four fixed gear wheels of the transmission input shaft can be used for at least two gears. Preferably, the maximum of four shifting locations can be used on each countershaft, to get by with just maximal two actuator devices for activating the shifting locations. Also, other embodiments are possible. For instance, the configuration of the different gear wheel steps can provide, that the gear wheels steps for the third and the fifth power shiftable forward gears are located in one gear plane. Also, the gear wheel step of the second power shiftable forward gear, for instance, and at least of one reverse gear can be located in one gear plane. In an advantageous way, just three idler gear wheels are needed on a countershaft for the forward gearing, which mesh with the fixed gear wheels of the transmission input shaft, and just two idler gear wheels are needed on the other countershaft, which also mesh with fixed gear wheels of the transmission input shafts.

To implement the reverse gears in this inventive dual clutch transmission, an intermediate gear wheel can be used, and is positioned on an intermediate shaft. It is also possible, that one of the idler gear wheels on a countershaft serves as in intermediate gear wheel for at least one reverse gear. Hereby, no additional intermediate shaft is required for the reverse gearing, as one of the idler gear wheels meshes with a fixed gear wheel as well as with an additional, shiftable idler gear wheel on the other countershaft. Hereby, the intermediate gear wheel, required for the reverse gear, is positioned as a shiftable idler gear wheel on a countershaft and serves, in addition, for the realization of at least an additional forward gear. The intermediate gear can always be designed as a step gear, independent of the position of the intermediate gear wheel on the countershaft or on the additional intermediate shaft.

To achieve the required transmission ratio steps, the inventive dual clutch transmission can include, on each countershaft, at least one dual action coupling device is positioned at a shifting location. Each of the provided coupling devices can, in the activated mode and dependent on the operating direction, connect an assigned idler gear wheel to the countershaft in a rotationally fixed manner. In addition, a single action shifting device can be positioned on at least one countershaft at a shifting location. As coupling devices, for instance, hydraulic, electric, pneumatic, mechanically operated clutches can be used, or also interlocking claw clutches or any kind of synchronization device can be used, connect an idler gear wheel with a countershaft in a rotationally fixed manner. It is also possible, that a dual action coupling device is replaced by two single action coupling devices or vice versa.

It is possible that the mentioned options for positioning of the gear wheels vary, and also the number of gear wheels and coupling devices can be changed to realize additional power engaging and non-power engaging gears, for further reduction of installation space and component cost reduction for this inventive dual clutch transmission. Especially fixed gear wheels of dual gear planes can be split into two fixed gear wheels for two single gear planes. Hereby, the stepping can be improved. It is also possible, to swap the countershafts. The partial transmissions can also be swapped, meaning mirror imaging around a vertical axle. Hereby, the hollow shaft and the solid shaft are swapped. It is possible hereby to position the smallest gear wheel on the solid shaft, to further optimize the use of the available installation space. In addition, adjacent wheel planes can be swapped, to optimize a deflection of the shaft and/or the connecting of a shifting actuator device. Also, the respective mounting position of the coupling devices on the wheel plane can be varied. In addition, also the direction of action of the coupling devices can be varied.

The gear numbering used herein is freely defined. It is also possible to add a low speed gear, to improve the off road characteristics or the acceleration performance of a motor vehicle. In addition, the first gear can be left out, for instance, to better optimize the entirety of the gear steps. The numbering of the gears varies by way of these measures accordingly.

The proposed dual clutch transmission is preferably equipped with an integrated output stage. The output stage can comprise a fixed gear wheel on the output shaft which serves as an output gear wheel and which meshes with the first output gear wheel on the first countershaft and the second output gear wheel on the second countershaft. Depending on the embodiment variation, at least one of the output gear wheels is designed as a gear wheel that is shifted via a coupling device.

Advantageously, the lower forward gears and the reverse gears can be activated by means of a start clutch, or shift clutch to hereby focus higher loads on this clutch and to construct the second clutch with a lower need for space and more cost-effective. Especially, the wheel planes in the proposed dual clutch transmission can be positioned in a way such that one can start, via either the inner transmission input shaft or the outer transmission input shaft and thus by means of whichever clutch is best suited, which is also possible with a concentrically arranged, radially nested configuration of the dual clutch. The wheel planes can be positioned as mirror-symmetric, or swapped, respectively. It is also possible that the countershafts are swapped or positioned in a mirror symmetrically.

Independent of the respective embodiment variations, for instance, the provided wheel planes of the dual clutch transmission can be swapped. It is also possible, to use instead of a dual wheel plane two single wheel planes and/or vice versa. In addition, the two partial transmissions can be positioned as mirrored.

BRIEF DESCRIPTION OF THE DRAWINGS

Following, the present invention is further explained based on the drawings. It shows:

FIG. 2 a shift scheme of the first embodiment variation in accordance with FIG. 1;

FIG. 4 a shift scheme of the second embodiment variation in accordance with FIG. 3;

FIG. 6 a shift scheme of the third embodiment variation in accordance with FIG. 5;

FIG. 8 a shift scheme of the fourth embodiment variation in accordance with FIG. 7;

FIG. 10 a shift scheme of the fifth embodiment variation in accordance with FIG. 9.

DETAILED DESCRIPTION OF THE PREFERRED EMBODIMENTS

Figure 1:
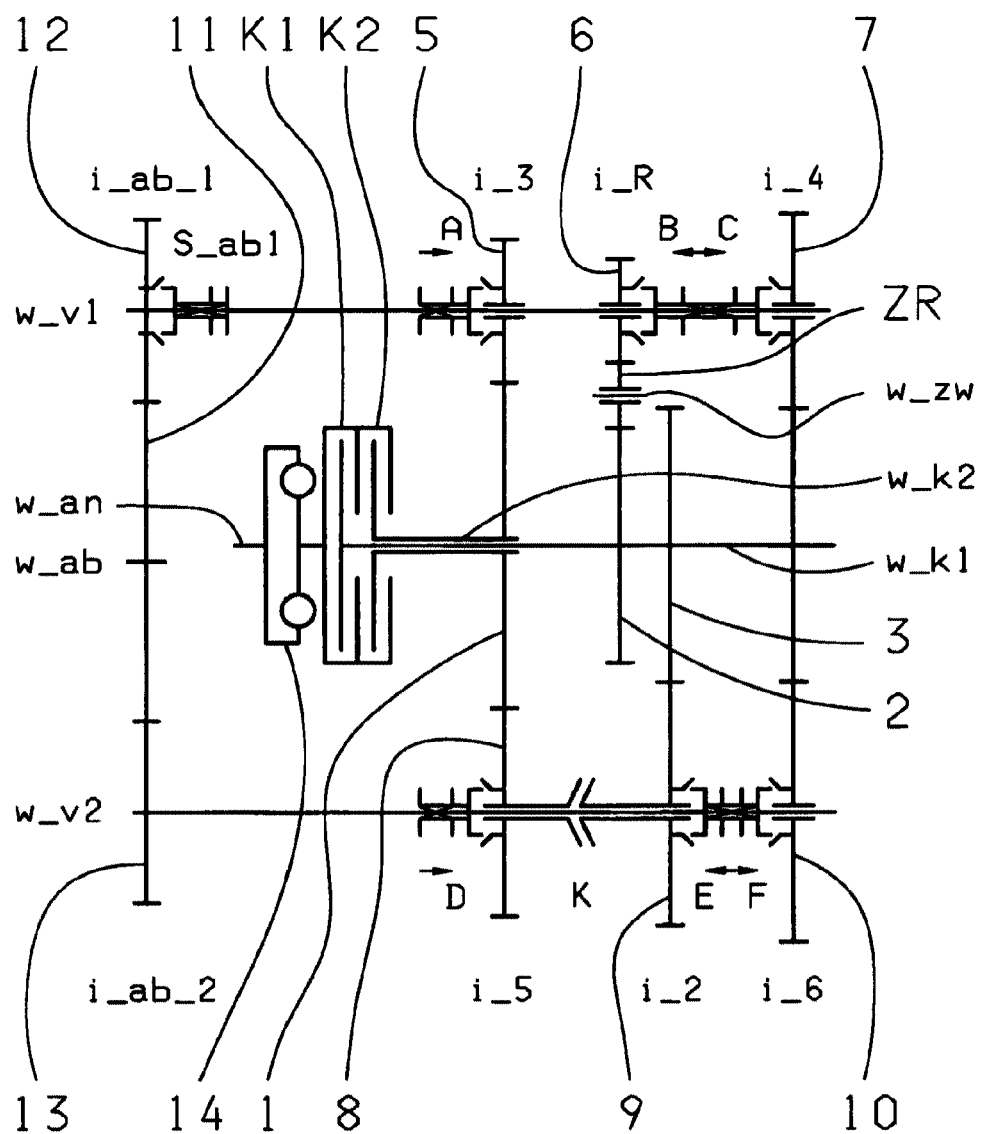
FIG. 1 a schematic view of a first embodiment variation of an inventive 7-gear dual clutch transmission.

FIGS. 1, 3, 5, 7, and 9 each show a possible embodiment variation of a 7-gear dual clutch transmission. The respective shifting schemes, in accordance with the embodiment variations, are presented accordingly as tables in the FIGS. 2, 4, 6, 8, and 10.

The 7-gear dual clutch transmission comprises, independent from the respective embodiment variations, two clutches, K1, K2, in which the input sides are connected to a drive shaft w_an, and the output sides of each are connected with one of the two, coaxially arranged, transmission input shafts w_K1, w_K2. A torsion vibration damper 14 can be arranged on the drive shaft w_an. In addition, two countershafts w_v1, w_v2 are provided, on which gear wheels are rotatably arranged and designed as idler gear wheel 5, 6, 7, 8, 9, 10. On the two transmission input shafts w_K1, w_K2, gear wheels are arranged as fixed wheels, 1, 2, 3, 4 in a rotationally fixed manner and which at least partially mesh with the idler gear wheels 5, 6, 7, 8, 9, 10.

To link the idler gear wheels 5, 6, 7, 8, 9, 10 with the respective countershaft w_v1, w_v2, several activating coupling devices A, B, C, D, E, F are provided on the countershafts w_v1, w_v2. Both countershafts w_v1, w_v2 comprise, output gear wheels 12, 13, which are designed as constant pinions, which are each coupled with the gearing of an output shaft w_ab.

Thus, four gear planes are provided in this inventive dual clutch transmission, whereby in each embodiment variation two dual gear planes 5-8, 6-9; 5-8 7-10 are provided, and two single gear planes 6-2, 3-9; 7-3, 4-10 are provided, so that at least one winding-path gear can be shifted via at least a shifting device K on the second countershaft w_v2, and at least one winding-path gear via a disengaged coupling device S_ab1, assigned to the output gear wheel 12 on the first countershaft w_v1.

The dual clutch transmission, is provided with, in addition to the coupling devices A, B, C, D, E, F, which connect between a gear wheel and the assigned countershaft w_v1, w_v2 in a rotationally fixed manner, at least a coupling device S_ab1, which is assigned to the output gear wheel 12, and which is not engaged when shifting at least one winding-path gear, on the first countershaft w_v1, to disconnect the output gear wheel 12 from the first countershaft w_v1. In addition, at least the shifting device K is arranged on the second countershaft w_v2, to shift at least one winding-path gear via the activated shifting device K, where the shifting device K connects the idler gear wheel 8 with the idler gear wheel 9 on the second countershaft w_v2 in a rotationally fixed manner.

Independent of the respective embodiment variation of the dual clutch transmission, the idler gear wheel 8 of the second partial transmission is connected with the idler gear wheel 9 of the first partial transmission, via the shifting device K on the second countershaft w_v2, so that by way of the activated shifting device K at least a seventh forward gear G7 can be shifted as a winding-path gear, with a disengaged coupling device S_ab1 on the first countershaft w_v1, the output gear wheel 12 is decoupled from the first countershaft w_v1, so that at least a first forward gear G1 can be shifted.

It is also possible in the first and second embodiment variations, when the coupling device S_ab1 is disengaged, that a low speed gear C1 can be shifted as a winding-path gear. With reference to the fifth embodiment variation, when the coupling device S_ab1 is not engaged, a reverse gear R1 can be shifted as a winding-path gear, and via the engaged shifting device K, the first forward gear G1, and also the seventh forward gear G7 can be shifted as a winding-path gear.

Thus, independent of the respective embodiment variation of the dual clutch transmission, the first and the highest forward gear are winding-path gears.

Figure 7:
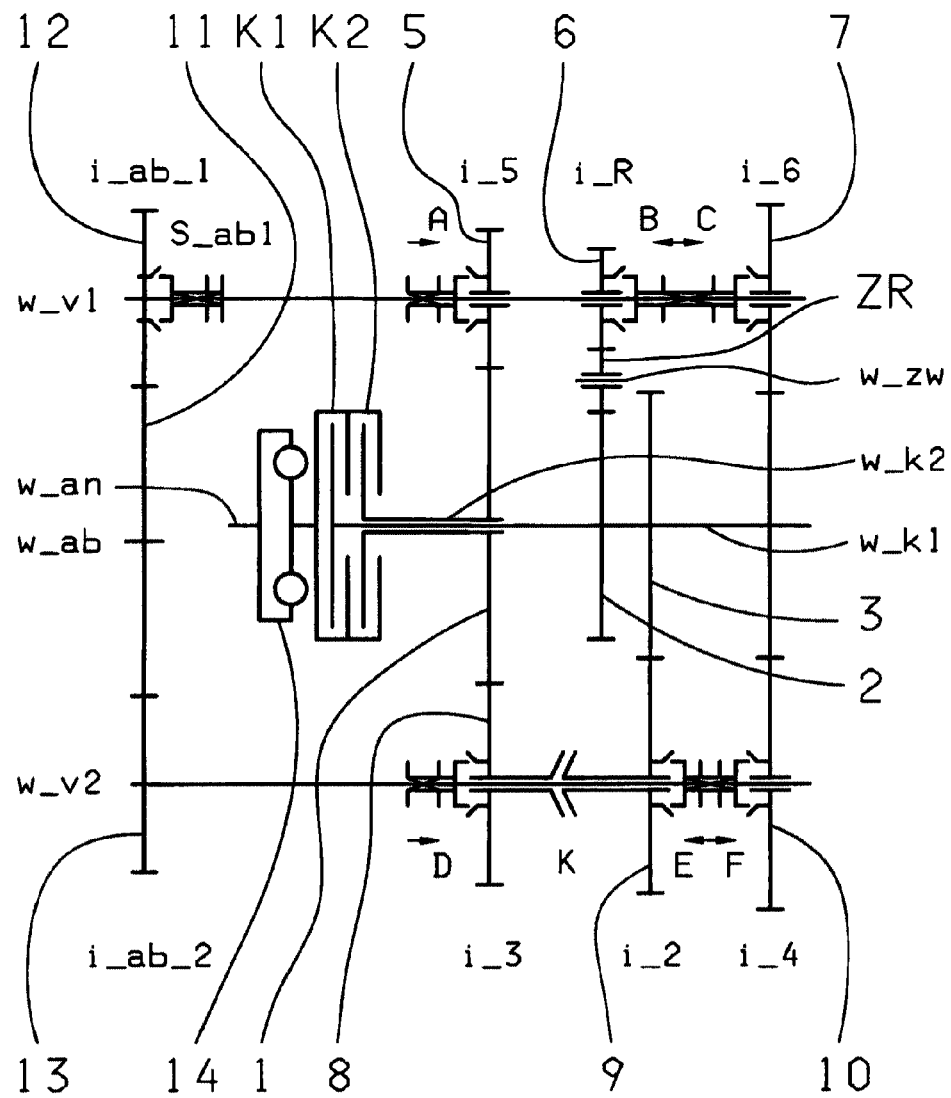
FIG. 7 a schematic view of the fourth embodiment variation of the inventive 7-gear dual clutch transmission.

In the first and fourth embodiment variation, in accordance with FIGS. 1 and 7, in the first gear plane, designed as dual gear plane 5-8, the fixed gear wheel 1 on the second transmission input shaft w_K2 meshes with the idler gear wheel 5 on the first countershaft w_v1, and the idler gear wheel 8 on the second countershaft w_v2. In the second gear plane, designed as single gear plane 6-2, the fixed gear wheel 2 on the first transmission input shaft w_K1 meshes only with the intermediate gear wheel ZR, whereby the intermediate gear wheel ZR enables the rotation reversal for the realization of the reverse gears R1, R2. The intermediate gear wheel ZR is rotatably arranged on an intermediate shaft w_zw, the intermediate shaft w_zw, in this example, is positioned in parallel to the countershafts w_v1, w_v2. The intermediate gear wheel ZR meshes also with the idler gear wheel 6 on the first countershaft w_v1. In the third gear plane, designed as single gear plane 3-9, the idler gear wheel 3 on the first transmission input shaft w_K1, meshes with the idler gear wheel 9 on the second countershaft w_v2. Finally, in the fourth gear plane, designed as dual gear plane 7-10, the fixed gear wheel 4 on the first transmission input shaft meshes with the idler gear wheel 10 on the second countershaft w_v2, and the idler gear wheel 7 on the first countershaft w_v1. The fifth embodiment variation, in accordance with FIG. 9, differs only by the fact, that the intermediate gear wheel ZR, for the rotation reversal, is arranged in the fourth gear plane which is, designed as dual gear plane 7-10, between the fixed gear wheel 4 and the idler gear wheel 7.

Figure 3:
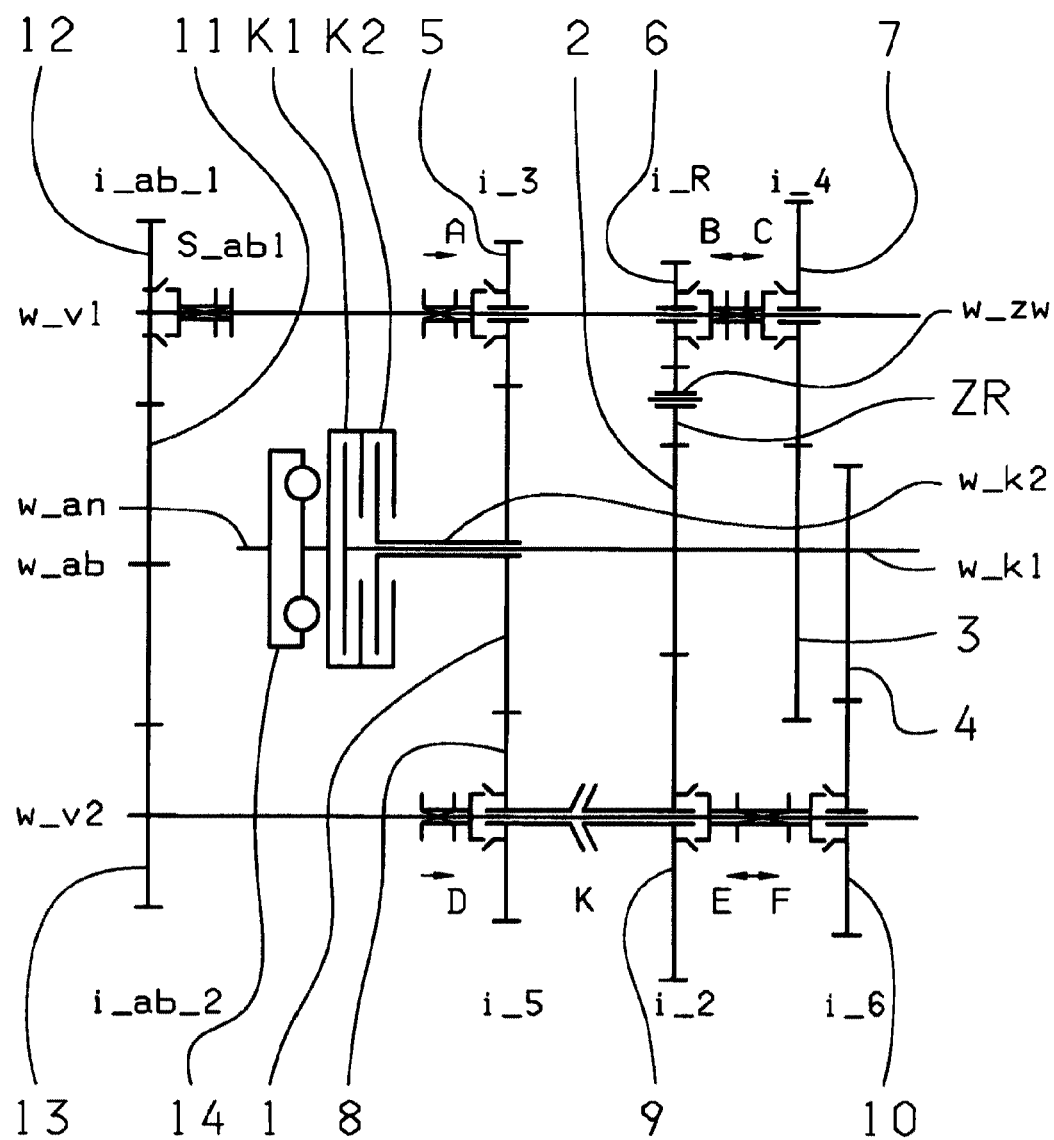
FIG. 3 a schematic view of a second embodiment variation of the inventive 7-gear dual clutch transmission.

In the second embodiment variation, in accordance with FIG. 3, in the first gear plane, designed as dual gear plane 5-8, the fixed gear wheel 1 on the second transmission input shaft w_K2 meshes with the idler gear wheel 5 on the first countershaft w_v1 and with the idler gear wheel 8 on the second countershaft w_v2. In the second gear plane, designed as dual gear plane 6-9, the fixed gear wheel 2 on the first transmission input shaft w_K1 meshes with the idler gear wheel 9 on the second countershaft w_v2. Also, the fixed gear wheel 2 on the first transmission input shaft w_K1 meshes with an intermediate gear wheel ZR, whereby the intermediate gear wheel ZR enables the rotation reversal for the realization of a reverse gear R1, R2. The intermediate gear wheel ZR is rotatable positioned on an intermediate shaft w_zw, whereby the intermediate shaft w_zw, in this example, is positioned in parallel with the countershafts w_v1, w_v2. The intermediate gear wheel ZR meshes also with the idler gear wheel 6 on the first countershaft w_v1. In the third gear plane, designed as single gear plane 7-3, the fixed gear wheel 3 on the first transmission input shaft w_K1 meshes with the idler gear wheel 7 on the first countershaft w_v1. Finally, in the fourth gear plane, designed as single gear plane 4-10, the fixed gear wheel 4 on the first transmission input shaft w_K1 meshes with the idler gear wheel 10 on the second countershaft w_v2. The third embodiment variation, in accordance with FIG. 5, differs only by the fact, that the intermediate gear wheel for the realization of the rotation reversal is positioned in the fourth gear plane, designed as a single gear plane 4-10, between the fixed gear wheel 4 and the idler gear wheel 10.

In all embodiment variations, on each countershaft w_v1, w_v2, a dual action coupling device B,C; E, F is positioned. In the first, the fourth, and the fifth embodiment variation, in accordance with FIGS. 1, 7, and 9, on the first countershaft w_v1, the dual action coupling device B, C is positioned between the second gear plane, designed as single gear plane 6-2, and the fourth gear plane, designed as dual gear plane 7-10, and on the second countershaft w_v2, the dual action coupling device E, F is positioned between the third gear plane, designed as single gear plane 3-9, and the fourth gear plane, designed as dual gear plane 7-10.

Figure 5:
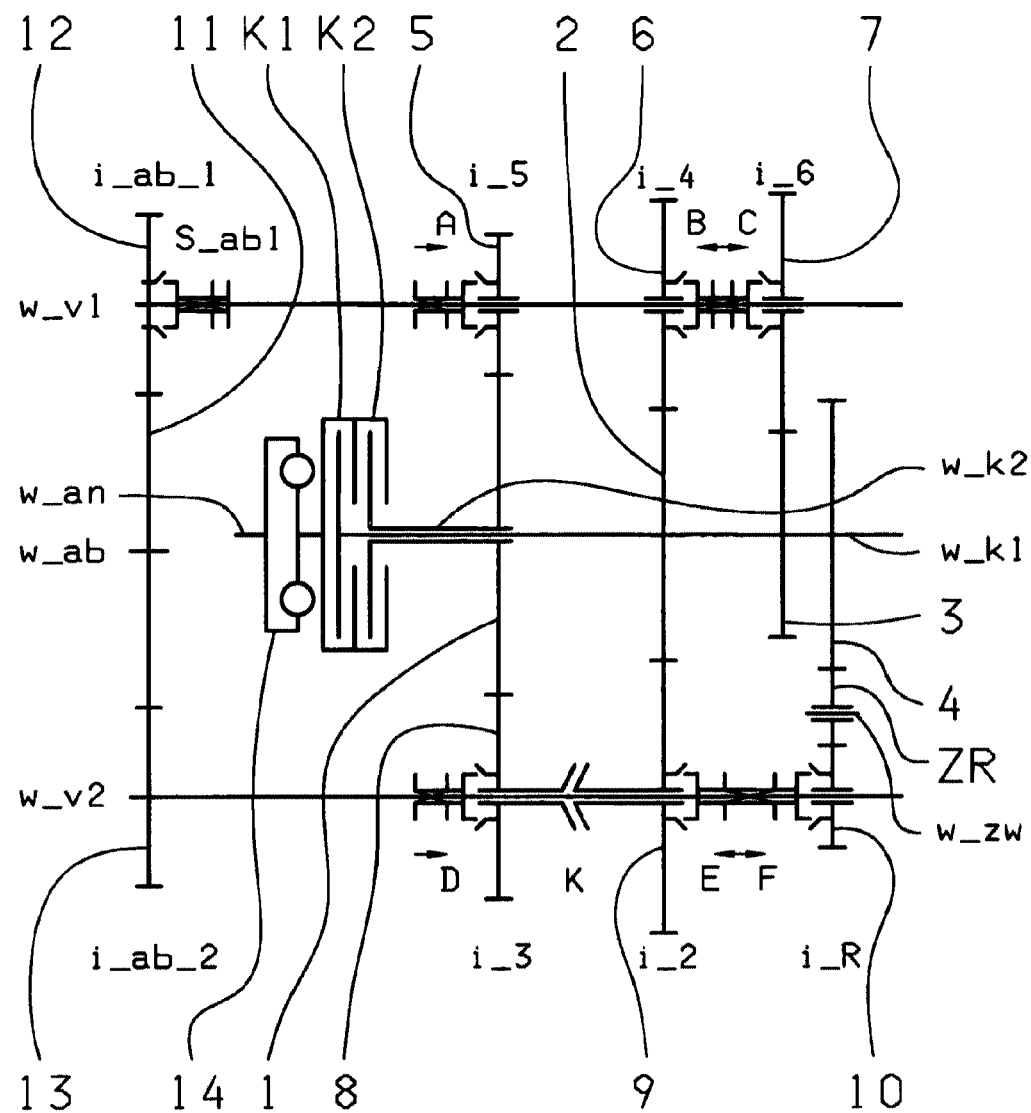
FIG. 5 a schematic view of a third embodiment variation of the inventive 7-gear dual clutch transmission.

In the second and third embodiment variation, in accordance with FIGS. 3 and 5, the dual action coupling device B, C is here positioned on the first countershaft w_v1, between the second gear plane, designed as a dual gear plane 6-9, and the third gear plane, designed as single gear plane 7-3, and the dual action coupling device E-F is positioned on the second countershaft w_v2, between the second gear plane, designed as dual gear plane 6-9, and the fourth gear plane, designed as single gear plane 4-10.

Independent of the respective embodiment variation, for each dual action coupling device B, C: E, F two single action coupling devices can be provided. Via the coupling device B, the idler gear wheel 6 can be connected with the first countershaft w_v1, and via the coupling device C, the idler gear wheel 7 can be connected with the first countershaft w_v1. Via the coupling device E, the idler gear wheel 9 can be connected with the second countershaft w_v2, and via the coupling device F, the idler gear wheel 10 can be connected with the second countershaft w_v2.

Furthermore, each embodiment variation provides that, for instance, a single action coupling device A of the first gear plane is assigned as dual gear plane 5-8, to connect the idler gear wheel 5 with the first countershaft w_v1. Also, a single action coupling device D in the first gear plane is assigned as dual gear plane 5-8, to connect the idler gear wheel 8 with the second countershaft w_v2.

In the inventive dual clutch transmission, an integrated output stage is provided through the output gear wheel 12 and through the output gear wheel 13, whereby the output gear wheel 12 and the output gear wheel 13 each mesh with a fixed gear wheel 11 of the output shaft w_ab. In all embodiment variations, the output gear wheel 12 is coupled via the coupling device S_ab1 to the first countershaft w_v1, whereby the output gear wheel 13, can be connected with the second countershaft w_v2 in a rotationally fixed manner.

In the presented tables in FIGS. 2 and 4, exemplary shifting schemes are shown for the first and second embodiment variations of the 7-gear dual clutch transmission, in accordance with FIGS. 1 and 3.

These shift schemes shown, that the first forward gear G1 can be shifted via the second clutch K2, via the activated coupling device A, via the activated coupling device C, and via the activated coupling device E, and via the disengaged coupling device S_ab1 as a winding-path gear, the second forward gear G2 can be shifted via the first clutch K1, and via the activated coupling device E, and when the coupling device S_ab1 is engaged, the third forward gear G3 can be shifted via the second clutch K2 and via the activated coupling device A, and when the coupling device S_ab1 is engaged, the fourth forward gear G4 can be shifted via the first clutch K1 and via the activated coupling device C, and when the coupling device S_ab1 is engaged, the fifth forward gear G5 can be shifted via the second clutch K2 and via the activated coupling device D, and when the coupling device S_ab1 is engaged, that sixth forward gear G6 can be shifted via the first clutch K1 and via the activated coupling device F, and when the coupling device S_ab1 is engaged, and that the seventh forward gear G7 can be shifted via the second clutch K2, via the activated coupling device C, and when the coupling device S_ab1 is engaged, and via the activated coupling device K as a winding-path gear. Also, a reverse gear R1 is shifted via the first clutch K1 and via the activated coupling device B, and when the coupling device S_ab1 is engaged, and a low speed gear C1 can be shifted via the first clutch K1, via the activated coupling device A, and when the coupling device S_ab1 is engaged, and via the activated shifting device K as a winding-path gear.

If, in the first and second embodiment variation, a coupling device S_ab2 is positioned, for instance, on the second countershaft w_v2, an additional reverse gear R2 can be shifted via the second clutch K2 and via the activated coupling device B, via the activated coupling device D, and via the activated coupling device F as a winding-path gear, if the coupling device S_ab2 is not engaged and the coupling device S_ab1 is engaged.

From the shifting schemes, in accordance with FIGS. 2 and 4, it can be seen in particular that in the first forward gear G1, starting from the second clutch K2, the gear wheel steps i_3, i_4, and i_2 are used, whereby the possibility of coupling the two partial transmissions can be realized when the coupling device S_ab1 is not engaged. In the second forward gear G2, only the gear wheel step i_2 is used, in the third forward gear G3, the gear wheel step i_3, in the fourth forward gear G4, the gear wheel step i_4, in the fifth forward gear G5, the gear wheel step i_5, and in the sixth forward gear G6, the gear wheel steps i_6 are used. In the seventh forward gear G7, the gear wheel steps i_5, i_2, and i_4 are applied, whereby the possibility of coupling the two partial transmissions is realized through the engaged shifting device K. In the reverse gear R1, only the gear wheel step i_R is used in second gear plane, designed as a single gear plane 6-2, whereby and additional, possible reverse gear R2, as a winding gear and starting from the second clutch K2, uses the gear wheels steps i_5, i_6, and i_R, whereby the possibility of coupling the two partial transmissions is realized through the disengaged coupling device S_ab2 and the engaged coupling device S_ab1. Finally, in the low speed gear C1, starting from the first clutch K1, the gear wheel steps i_2, i_5 and i_3 are used, whereby the possibility of coupling the two partial transmissions is realized via the engaged shifting device K.

Due to the fact that, in the first embodiment variation, the gear wheel steps of the second forward gear G2 are assigned to a single gear plane 3-9, and the forward gears G1 and G7, for instance, are realized via the gear wheel steps i_2 and i_4, an especially better, geometric gear stepping can be achieved. Due to the fact, that in the second embodiment variation, the gear wheel steps of the fourth forward gear G4 and the sixth forward gear G6 are each assigned to a single gear plane 7-3, 4-10, the highest gears G4 to G7, in comparison to the first embodiment variation, can be better matched.

The presented table in FIG. 6 shows an exemplary shifting scheme for the third embodiment variation of the 7-gear dual clutch transmission, in accordance with FIG. 5.

From the shifting scheme can be seen that, the first forward gear G1 can be shifted via the second clutch K2, via the activated coupling device A, via the activated coupling device C, and via the activated coupling device E, and via the non-engaged coupling device S_ab1 as a winding-path gear, the second forward gear G2 can be shifted via the first clutch K1 and via the activated coupling device E, and when the coupling device S_ab1 is engaged, the third forward gear G3 can be shifted via the second clutch K2 and via the activated coupling device D, and when the coupling device S_ab1 is engaged, the fourth forward gear G4 can be shifted via the of first clutch K1, and via the activated coupling device B and when the coupling device S_ab1 is engaged, the fifth forward gear G5 can be shifted via the second clutch K2 and via the activated coupling device A, and when the coupling device S_ab1 is engaged, the sixth forward gear G6 can be shifted via the first clutch K1, and via the activated coupling device C, and when the coupling device S_ab1 is engaged, and the seventh forward gear G7 can be shifted via the second clutch K2 and via the activated coupling device C, and via the engaged shifting device K as a winding-path gear. Also, a reverse gear R1 can be shifted via the first clutch K1, and via the activated coupling device F, and when the coupling device S_ab1 is engaged. Furthermore, an additional reverse gear R2 can be shifted via the second clutch K2, via the activated coupling device A, via the activated coupling device C, and via the activated coupling device F, and via the non-engaged coupling device S_ab1 as a winding-path gear.

From the shifting scheme, in accordance with FIG. 6, can be seen in particular that in the first forward gear G1, starting from the second clutch K2, the gear wheel steps i_5, i_6, and i_2 are used, whereby the possibility of coupling the two partial transmissions is realized through the disengaged coupling device S_ab1. In the second forward gear G2 only the gear wheel step i_2 is used, in the third forward gear G3, the gear wheel step i_3, in the fourth forward gear G4, the gear wheel step i_4, in the fifth forward gear G5, the gear wheel step i_5, and in the sixth forward gear G6, the gear wheel step i_6 is used. In the seventh forward gear G7, the gear wheels steps i_3, i_2, i_6 are used, whereby the possibility of coupling the two partial transmissions is realized through the engaged shifting device K. In the reverse gear R1, only the gear wheel step i_R is used. In the additional forward gear R2, as a winding-path gear, the gear wheels steps i_5, i_6, and i_R are used, whereby the two partial transmissions are coupled via the disengaged coupling device S_ab1.

The third embodiment variation realizes a power shiftable 7-gear transmission, whereby at least two reverse gears can be presented, without the use of additional shifting or additional coupling devices, by means of the coupling device S_ab1 and the assignment of the reverse gear wheel i_R to a single gear plane 4-10.

The presented table in FIG. 8 shows exemplary a shifting scheme for the fourth embodiment variation of the 7-gear dual clutch transmission, in accordance with FIG. 7.

This shift scheme shows that, the first forward gear G1 can be shifted via the second clutch K2, via the activated coupling device A, via the activated coupling device C, and via the activated coupling device E, and via the non-engaged coupling device S_ab1 as a winding-path gear, the second forward gear G2 can be shifted via the first clutch K1 and via the activated coupling device E, and when the coupling device S_ab1 is engaged, the third forward gear G3 can be shifted via the second clutch K2 and via the activated coupling device D, and when the coupling device S_ab1 is engaged, the fourth forward gear G4 can be shifted via the first clutch K1, and via the activated coupling device F, and when the coupling device S_ab1 is engaged, the fifth forward gear G5 can be shifted via the second clutch K2, and via the activated coupling device A, and when the coupling device S_ab1 is engaged, the sixth forward gear G6 can be shifted via the first clutch K1 and via the activated coupling device C, and when the coupling device S_ab1 is engaged, and the seventh forward gear G7 can be shifted via the second clutch K2 and via the activated coupling device C, and via the activated shifting device K as a winding-path gear. Also, a reverse gear R1 can be shifted via the first clutch K1 and via the activated coupling device B, and when the coupling device S_ab1 is engaged.

In the fourth embodiment variation if, an additional coupling device S_ab2 is provided, on the second countershaft w_v2, and is assigned to disengage the output gear wheel 13, in the disengaged condition of the coupling device S_ab2, from the second countershaft w_v2, an additional reverse gear R2 can be shifted via the second clutch K2, via the activated coupling device (B) and via the coupling device (D), and via the activated coupling device (F) as a winding-path gear, if the additional coupling device S_ab2 is disengaged and the coupling device S_ab1 is engaged.

In the fourth embodiment variation, if an additional shifting device I is provided on the first countershaft w_v1, to connect the idler gear wheel 5 with the idler gear wheel 6 on the first countershaft w_v1 in a rotationally fixed manner, in the engaged condition of the shifting device I, to couple the two partial transmissions, an additional reverse gear R3 can be shifted via the first clutch K1 and via the activated coupling device D as a winding-path gear, if the additional shifting device I and the coupling device S_ab1 are engaged.

The shifting scheme, of FIG. 8, shows that in the first forward gear G1, starting from the second clutch K2, the gear wheel steps i_5, i_6, and i_2 are used, whereby the possibility of coupling the two partial transmissions can be realized when the coupling device S_ab1 is non-engaged. In the second forward gear G2, only the gear wheel step i_2 is used, in the third forward gear G3, the gear wheel step i_3, in the fourth forward gear G4, the gear wheel step i_4, and in the fifth forward gear G5, the gear wheel step i_5, and in the sixth forward gear G6, the gear wheel step i_6 is used. In the seventh forward gear G7, shifted as a winding-path gear, the gear wheel steps i_3, i_2, and i_6 are applied, whereby the possibility of coupling the two partial transmissions is realized engagement of shifting device K. In the reverse gear R1, only the gear wheel step i_R is used. In the additional reverse gear R2, as a winding-path gear, the gear wheels steps i_3, i_4, i_R are used, whereby to couple of the two partial transmissions, the coupling device S_ab2 is disengaged. The following reverse gear R3, is shifted as a winding-path gear, using the gear wheel steps i_R, i_5, i_3, whereby, to couple the two partial transmissions, the shifting device I is engaged.

The fourth embodiment variation enables a power shiftable 7-gear transmission, due to the positioning of the gear wheel steps i_2, i_3, and i_4 on the second countershaft w_v2, which realizes advantages in regard to the gearing configuration and in regard to the bearing of the shaft and the shaft design.

Figure 9:
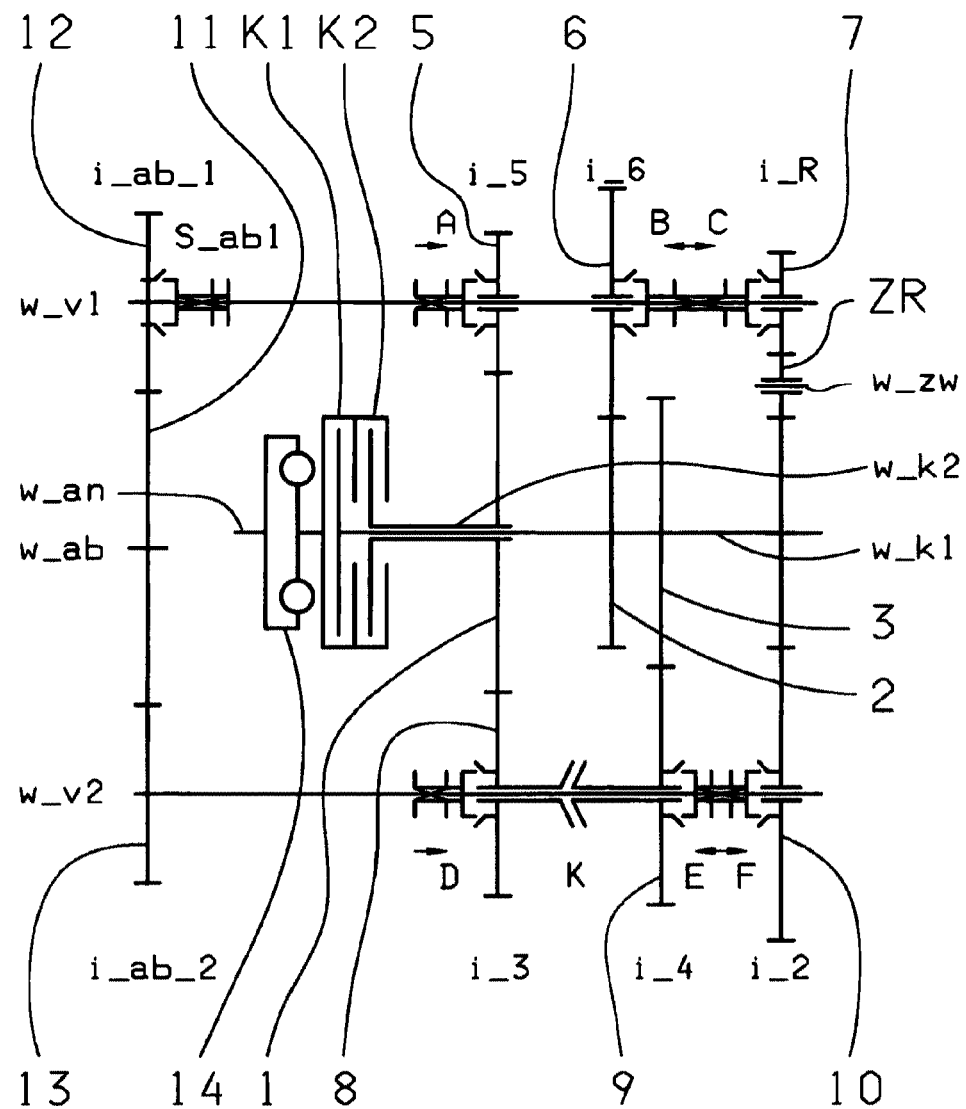
FIG. 9 a schematic view of the fifth embodiment variation of the inventive 7-gear dual clutch transmission.

The table presented in FIG. 10 shows an exemplary shifting scheme for the fifth embodiment variation of the 7-gear dual clutch transmission, in accordance with FIG. 9.

The shifting scheme shows that the first forward gear G1 can be shifted via the second clutch K2 and via the activated coupling device F, and when the coupling device S_ab1 is engaged, and via the activated shifting device K as a winding-path gear, the second forward gear G2 can be shifted via the of first clutch K1, and via the activated coupling device F, and when the coupling device S_ab1 is engaged, that the third forward gear G3 can be shifted via the second clutch K2 and via the activated coupling device D and when the coupling device S_ab1 is engaged, the fourth forward gear G4 can be shifted via the first clutch K1 and via the activated coupling device E, and when the coupling device S_ab1 is engaged, the fifth forward gear G5 can be shifted via the second clutch K2 and via the activated shifting device A, and when the coupling device S_ab1 is engaged, the sixth forward gear G6 can be shifted via the first clutch K1 and via the activated coupling device B, and when the coupling device S_ab1 is engaged, and the seventh forward gear G7 can be shifted via the first clutch K1 and via the activated coupling device A, and via the activated shifting device K as a winding-path gear. Also, a reverse gear R1 can be shifted via the first clutch K1, via the activated shifting device A, via the activated coupling device C, and via the activated coupling device D, and via the disengaged coupling device S_ab1 as a winding-path gear.

In the fifth embodiment variation, if an additional coupling device S_ab2 is provided on the second countershaft w_v2, to decouple, when not engaged, the output gear wheel 13 from the second countershaft w_v2, an overdrive gear O1 can be shifted via the second clutch K2, via the activated coupling device B and via the activated coupling device D, and via the activated coupling device F as a winding-path gear, when the additional coupling device S_ab2 is not engaged.

From the shifting scheme, in accordance with FIG. 10, can be seen in particular in the first forward gear G1, designed as a winding-path gear, starting from the second clutch K2, the gear wheel steps i_3, i_4 and i_2 are used, whereby the two partial transmissions are coupled via the engaged shifting device K. In the second forward gear G2, only the gear wheel step i_2 is used, in the third forward gear G3, the gear wheel step i_3, in the fourth forward gear G4, the gear wheel step i_4, and the fifth forward gear G5, the gear wheel step i_5, and in the sixth forward gear G6, the gear wheel step i_6 is used. In the seventh forward gear G7, as a winding-path gear, the gear wheel steps i_4, i_3, and i_5 are applied, coupling the two partial transmissions is realized through the engaged shifting device K. In the reverse gear R1, as a winding-path gear, the gear wheels steps i_R, i_5, i_3 are used, coupling the two partial transmissions is realized via the non-engaged coupling device S_ab1. The overdrive gear O1, as a winding-path gear, uses the gear wheel steps i_3, i_2, i_6, whereby, for coupling the two partial transmissions, the coupling device S_ab2 is not engaged.

Due to the fact, in the fifth embodiment variation the gear wheels step of the fourth forward gear G4 is assigned to a single gear plane 3-9, and the first forward gear G1 and the seventh forward gear G7 are winding via the gear wheels step i_4, the gear steps can be well matched.

Summarizing the first and the second embodiment variations, as seen in FIGS. 1 and 3, it can be seen that, in the first gear plane, designed as dual gear plane 5-8, the idler gear wheel 5 can be used for three forward gears G1, G3, C1, and the idler gear wheel 8 can be used for three forward gears G5, G7, C1, as well as for a reverse gear R2. In the second gear plane, designed as single gear plane 6-2, the idler gear wheel 6 can be used for the reverse gears R1, R2. Also, in the third gear plane, designed as single gear plane 3-9, the idler gear wheel 9 can be used for the four forward gears G1, G2, G7, C1. Finally, in the fourth gear plane, designed as dual gear plane 7-10, the idler gear wheel 7 can be used for the forward gears G1, G4, G7, and the idler gear wheel 10 can be used for the forward gear G6 and a reverse gear R2.

Summarizing the third embodiment variation, in accordance with FIGS. 5 and 6, it can be seen that in the first gear plane, designed as dual gear plane 5-8, the idler gear wheel 5 can be used for two forward gears G1, G5, as well as for a reverse gear R2, and the idler gear wheel 8 can be used for 2 forward gears G3, G7. In the second gear plane, designed as dual gear plane 6-9, the idler gear wheel 6 can be used for a forward gear G4 and the idler gear wheel 9 can be used for three forward gears G1, G2, G7. Also, in the third gear plane, designed as single gear plane 7-3, the idler gear wheel 7 can be used for three forward gears G1, G6, G7 and for a reverse gear R2. Finally, in the fourth gear plane, designed as single gear plane 4-10, the idler gear wheel 10 can be used for two reverse gears R1, R2.

Summarizing the fourth embodiment variation, in accordance with FIGS. 7 and 8, it can be seen that in first gear plane, designed as dual gear plane 5-8, the idler gear wheel 5 can be used for 2 forward gears G1, G5, as well as for a reverse gear R3, and the idler gear wheel 8 can be used for 2 forward gears G3, G7, as well as for two reverse gears R2, R3 in the second gear plane, designed as single gear plane 6-2, the idler gear wheel 6 can be used for three reverse gears R1, R2, R3. Also in the third gear plane, designed as single gear plane 3-9, the idler gear wheel 9 can be used for three forward gears G1, G2, G7. Finally, in the fourth gear plane, designed as dual gear plane 7-10, the idler gear wheel 10 can be used for a forward gear G4, as well as for a reverse gear R2, and the idler gear wheel 7 can be used for 3 forward gears G1, G6, and G7.

Summarizing the fifth embodiment variation, in accordance with FIGS. 9 and 10, it can be seen that in the first gear plane, designed as dual gear plane 5-8, the idler gear wheel 5 can be used for two forward gears G5, G7, as well as for a reverse gear R1, and the idler gear wheel 8 can be used for 4 forward gears G1, G3, G7, O1, as well as for a reverse gear R1. In the second gear plane, designed as single gear plane 6-2, the idler gear wheel 6 can be used for two forward gears G6, O1. Also, in the third gear plane, designed as single gear plane 3-9, the idler gear wheel 9 can be used for 3 forward gears G1, G4, G7. Finally, in the fourth gear plane, designed as dual gear planes 7-10, the idler gear wheel 7 can be used for a reverse gear R1 and the idler gear wheel 10 can be used for 3 forward gears G1, G2, O1.

In all embodiment variations of the dual clutch transmission and due to the provided multiple use of certain idler gear wheels, less gear planes are required and therefore less components, but still having the same amount of gears, resulting in an advantageous construction space saving and in a cost reduction.

Independent from the respective embodiment variation, the numeral "1" in a box of the respective table of the shift schemes means that the associated clutch K1, K2, or the associated coupling devices A, B, C, D, E, F respectively, or the associated shifting devices K, I, respectively, are engaged. In contrast, an empty box in the respective table of the shift schemes means that the associated clutch K1, K2, or the associated coupling device A, B, C, D, E, F, respectively, or the associated shifting device K, I, respectively, are each non-engaged.

Deviating from the previously mentioned rules, it applies for the coupling device S_ab1, or S_ab2, respectively, assigned to a output gear wheel 12 or output gear wheel 13, that the coupling device S_ab1, or S_ab2, in case of an empty box in the associated table of the shift schemes, must be disengaged but that, a box having the numeral "1", depending on the gear in a first group of gears, the coupling device S_ab1, or S_ab2, must be respectively, engaged, and in a second group of gears, the coupling device S_ab1, or S_ab2 can be both disengaged or also engaged. In addition, there is the possibility in many cases to add additional coupling devices or shifting devices, without affecting the flow of force. A gear pre-selection is hereby enabled.

REFERENCE CHARACTERS

1 Fixed gear wheel on the second transmission input shaft
2 Fixed gear wheel on the first transmission input shaft
3 Fixed gear wheel on the first transmission input shaft
5 Idler gear wheel on the first countershaft
6 Idler gear wheel on the first countershaft
7 Idler gear wheel on the first countershaft
8 Idler gear wheel on the second countershaft
9 Idler gear wheel on the second countershaft
10 Idler gear wheel on the second countershaft
K1 first clutch
K2 second clutch
w_an Drive Shaft
w_ab Output Shaft
w_v1 first Countershaft
w_v2 second Countershaft
A Coupling Device
B Coupling Device
C Coupling Device
D Coupling Device
E Coupling Device
F Coupling Device
i_1 Gear Wheel Step, first forward gear
i_2 Gear Wheel Step, second forward gear
i_3 Gear Wheel Step, third forward gear
i_4 Gear Wheel Step, fourth forward gear
i_5 Gear Wheel Step, fifth forward gear
i_6 Gear Wheel Step, sixth forward gear
G1 First forward gear
G2 Second forward gear
G3 Third forward gear
G4 Fourth forward gear
G5 Fifth forward gear
G6 Sixth forward gear
G7 Seventh forward gear
C1 Low Speed Gear
O1 Overdrive Gear
R1 Reverse Gear
R2 Reverse Gear
R3 Reverse Gear
w_zw Intermediate Shaft
ZR Intermediate Gear
11 Fixed Gear of the Drive Shaft
12 Output Gear Wheel of the first Countershaft
13 Output Gear Wheel of the second Countershaft
14 Torsion Vibration Damper
ZS Gear Wheel Step in use
S_ab1 Coupling Device, optional
S_ab2 Coupling Device, optional
K Shifting device
I Shifting device

The invention claimed is:

1. A dual clutch transmission comprising:
first and second clutches (K1, K2) each comprising an input side connected to a drive input shaft (w_an) and an output side respectively connected to one of first and second transmission input shafts (w_K1, w_K2) arranged coaxially with one another;
at least first and second countershafts (w_v1, w_v2) rotatably supporting idler gear wheels (5, 6, 7, 8, 9, 10);
at least one fixed gear wheel (1, 2, 3, 4) being connected in a rotationally fixed manner on each of the first and the second transmission input shafts (w_K1, w_K2), and each of the fixed gear wheels engaging with at least one of the idler gear wheels (5, 6, 7, 8, 9, 10);
a plurality of coupling devices (A, B, C, D, E, F) being supported on the first and the second countershafts (w_v1, w_v2), each of the coupling devices (A, B, C, D, E, F) coupling an idler gear wheel (5, 6, 7, 8, 9, 10) in a rotationally fixed manner to one of the first and the second countershafts (w_v1, w_v2);
output gear wheels (12, 13), on each of the first and the second countershafts (w_v1, w_v2), engaging gearing of an output shaft (w_ab) such that several power shiftable forward gears (1, 2, 3, 4, 5, 6) and at least one reverse gear (R1, R2, R3) being shiftable;
first and second dual gear planes (5-8, 7-10; 5-8, 6-9), each comprising an idler gear wheel (5, 8, 9, 7, 10) supported by the first countershaft (w_v1), an idler gear wheel (5, 8, 9, 7, 10) supported by the second countershaft (w_v1, w_v2) and a fixed gear wheel (1, 2, 3, 4) supported by one of the first and the second transmission input shafts (w_K1, w_K2), and at least one of the idler gear wheels (5, 6, 7, 8, 9, 10) supported by the first and the second countershafts (w_v1, w_v2) in each of the first and the second dual gear planes (5-8, 7-10; 5-8, 6-9) being utilized for implementing at least two of the gears; and
first and second single gear planes (6-2, 3-9; 7-3, 4-10), each comprising an idler gear wheel (5, 8, 6, 9, 7, 10)

supported by one of the first and the second countershafts (w_v1, w_v2) and a fixed gear wheel (1, 2, 3, 4) supported by one of the first and the second transmission input shafts (w_K1, w_K2) such that at least one shifting device winding-path gear is shiftable via at least a shifting device (K) on the second countershaft (w_v2), and at least one output coupling winding-path gear is shiftable via disengagement of an output coupling device (S_ab1) associated with the output gear wheel (12) on the first countershaft (w_v1).

2. The double clutch transmission according to claim 1, wherein an idler gear wheel (8) of a second partial transmission is connectable, via the shifting device (K) on the second countershaft (w_v2), to an idler gear wheel (9) of a first partial transmission such that, by engagement of the shifting device (K) on the second countershaft (w_v2), at least a seventh forward gear (G7) is shifted as the at lest one shifting device winding-path gear and the output gear wheel (12) is decoupled from the first countershaft (w_v1) by disengaging the output coupling device (S_ab1) on the first countershaft (w_v1) such that at least a first forward gear (G1) is shifted as the at least one output coupling winding-path gear.

3. The double clutch transmission according to claim 1, wherein a low speed gear (C1) is engaged as the at least one shifting device winding-path gear when the shifting element (K) on the second countershaft (w_v2) is engaged.

4. The double clutch transmission according to claim 1, wherein an idler gear wheel (8) of the second partial transmission is connected, via the shifting device (K) on the second countershaft (w_v2), to an idler gear wheel (9) of a first partial transmission such that, by engagement of the shifting device (K) on the second countershaft (w_v2), both a first forward gear (G1) and a seventh forward gear (G7) are engaged as first and second shifting device winding-path gears, and at least one reverse gear (R1) is engaged as the at least one output coupling winding-path gear by disengagement of an output coupling device (S_ab1) on the first countershaft (w_v1) such that the output gear wheel (12) on the first countershaft (w_v1) is decoupled from the first countershaft (w_v1).

5. The double clutch transmission according to claim 1, wherein the first dual gear plane (5-8) forms a first gear plane which comprises a fixed gear wheel (1) on the second transmission input shaft (w_K2), the first and the second single gear planes (6-2, 3-9) form second and third gear planes which comprise three fixed gear wheels (2, 3, 4) on the first transmission input shaft (w_K1) of a first partial transmission.

6. The double clutch transmission according to claim 1, wherein the first dual gear plane (5-8) forms a first gear plane which comprises a fixed gear wheel (1) on the second transmission input shaft (w_K2) of a second partial transmission, and the second dual gear plane (6-9) forms a second gear plane, and the first and the second single gear planes (7-3, 4-10) form third and fourth gear planes which comprise three fixed gear wheels (2, 3, 4) on the first transmission input shaft (w_K1) of a first partial transmission.

7. The double clutch transmission according to claim 1, wherein
a first forward gear (G1) is engaged as the at least one output coupling winding-path gear by engagement of the second clutch (K2), a first coupling device (A), a second coupling device (C), and a fourth coupling device (E), and disengagement of an output coupling device (S_ab1) of the first countershaft (w_v1);
a second forward gear (G2) is engaged by engagement of the first clutch (K1) and the fourth coupling device (E);
a third forward gear (G3) is engaged by engagement of the second clutch (K2) and the first coupling device (A);
a fourth forward gear (G4) is engaged by engagement of the first clutch (K1) and the second coupling device (C);
a fifth forward gear (G5) is engaged by engagement of the second clutch (K2) and a third coupling device (D);
a sixth forward gear (G6) is engaged by engagement of the first clutch (K1) and a fifth coupling device (F); and
a seventh forward gear (G7) is engaged as a first one of the at least one shifting device winding-path gear by engagement of the second clutch (K2), the second coupling device (C) and the shifting device (K) of the second countershaft (w_v2).

8. The double clutch transmission according to claim 7 wherein a reverse gear (R1) is engaged as a second one of the at least one shifting device winding-path gear by engagement of the first clutch (K1) and a sixth coupling device (B), and a low speed gear (C1) is engaged by engagement of the first clutch (K1), the first coupling device (A) and the shifting device (K) of the second countershaft (w_v2).

9. The double clutch transmission according to claim 1, wherein
a first forward gear (G1) is engaged as a first one of the at least one output coupling winding-path gear by engagement of the second clutch (K2), a first coupling device (A), a third coupling device (C) and a fifth coupling device (E), and disengagement of an output coupling device (S_ab1) of the first countershaft (w_v1);
a second forward gear (G2) is engaged by engagement of the first clutch (K1) and the fifth coupling device (E);
a third forward gear (G3) is engaged by engagement of the second clutch (K2) and a fourth coupling device (D);
a fourth forward gear (G4) is engaged by engagement of the first clutch (K1) and a second coupling device (B);
a fifth forward gear (G5) is engaged by engagement of the second clutch (K2) and the first coupling device (A);
a sixth forward gear (G6) is engaged by engagement of the first clutch (K1) and the third coupling device (C); and
a seventh forward gear (G7) is engaged as a first one of the at least one shifting device winding-path gear by engagement of the second clutch (K2), the third coupling device (C), and the shifting device (K) of the second countershaft (w_v2).

10. The double clutch transmission according to claim 9, wherein a reverse gear (R1) is engaged by engagement of the first clutch (K1) and a sixth coupling device (F), and a second reverse gear (R2) is engaged as a coming-path gear by engagement of the second clutch (K2), the first coupling device (A), the third coupling device (C) and the sixth coupling device (F), and disengaging the first output coupling device (S_ab1) of the first countershaft (w_v1).

11. The double clutch transmission according to claim 1, wherein
a first forward gear (G1) is engaged as the at least one output coupling winding-path gear by engagement of the second clutch (K2), a first coupling device (A), a second coupling device (C), and a fourth coupling device (E), and disengagement of an output coupling device (S_ab1) of the first countershaft (w_v1);
a second forward gear (G2) is engaged by engagement of the first clutch (K1) and the fourth coupling device (E);
a third forward gear (G3) is engaged by engagement of the second clutch (K2) and a third coupling device (D);
a fourth forward gear (G4) is engaged by engagement of the first clutch (K1) and a fifth coupling device (F);
a fifth forward gear (G5) is engaged by engagement of the second clutch (K2) and the first coupling device (A);

a sixth forward gear (G6) is engaged by engagement of the first clutch (K1) and the second coupling device (C); and a seventh forward gear (G7) is engaged as the at least one shifting device winding-path gear by engagement of the second clutch (K2), the second coupling device (C), and the shifting device (K) of the second countershaft (w_v2).

12. The double clutch transmission according to claim 11, wherein a reverse gear (R1) is engaged by engagement of the first clutch (K1) and a sixth coupling device (B).

13. The double clutch transmission according to claim 1, wherein a first forward gear (G1) is engaged as a first one of the at least one output coupling winding-path gear by engagement of the second clutch (K2), a fifth coupling device (F), and the shifting device (K) of the second countershaft (w_v2);

a second forward gear (G2) is engaged by engagement of the first clutch (K1) and the fifth coupling device (F);

a third forward gear (G3) is engaged by engagement of the second clutch (K2) and a third coupling device (D);

a fourth forward gear (G4) is engaged by engagement of the first clutch (K1) and a fourth coupling device (E);

a fifth forward gear (G5) is engaged by engagement of the second clutch (K2) and a first coupling device (A);

a sixth forward gear (G6) is engaged by engagement of the first clutch (K1) and a second coupling device (B); and a seventh forward gear (G7) is engaged as the at least one shifting device winding-path gear by engagement of the first clutch (K1), the first coupling device (A), and the shifting device (K) of the second countershaft (w_v2).

14. The double clutch transmission according to claim 13, wherein a reverse gear (R1) is engaged as a second one of the at least one output coupling winding-path gear by engagement of the first clutch (K1), the first shifting device (A), a sixth coupling device (C) and the third coupling device (D), and disengagement of an output coupling device (S_ab1) of the first countershaft (w_v1).

* * * * *